US012700155B2

(12) United States Patent
Sang et al.

(10) Patent No.: US 12,700,155 B2
(45) Date of Patent: Aug. 4, 2026

(54) METHOD, APPARATUS AND DEVICE, AND STORAGE MEDIUM FOR GENERATING IMAGES

(71) Applicant: Lemon Inc., Grand Cayman (KY)

(72) Inventors: Shen Sang, Los Angeles, CA (US);
Jing Liu, Los Angeles, CA (US);
Chunpong Lai, Los Angeles, CA (US);
Jingna Sun, Beijing (CN); Xu Wang,
Beijing (CN); Weihong Zeng, Beijing
(CN); Peibin Chen, Beijing (CN)

(73) Assignee: Lemon Inc., Grand Cayman (KY)

( * ) Notice: Subject to any disclaimer, the term of this patent is extended or adjusted under 35 U.S.C. 154(b) by 136 days.

(21) Appl. No.: 18/687,215

(22) PCT Filed: Jul. 15, 2022

(86) PCT No.: PCT/SG2022/050502
§ 371 (c)(1),
(2) Date: Feb. 27, 2024

(87) PCT Pub. No.: WO2023/027628
PCT Pub. Date: Mar. 2, 2023

(65) Prior Publication Data
US 2025/0005827 A1      Jan. 2, 2025

(30) Foreign Application Priority Data
Aug. 27, 2021    (CN) ......................... 202110998216.1

(51) Int. Cl.
*G06T 11/60* (2026.01)
*G06V 10/774* (2022.01)

(52) U.S. Cl.
CPC ............ *G06T 11/60* (2013.01); *G06V 10/774*
(2022.01)

(58) Field of Classification Search
CPC ........ G06T 11/60; G06T 11/40; G06F 18/214;
G06F 18/241; G06V 10/774; G06V
10/771; G06V 40/169
See application file for complete search history.

(56) References Cited

U.S. PATENT DOCUMENTS 11,074,733 B2 * 7/2021 Petriv ..................... G06T 11/60
11,790,558 B1 * 10/2023 Balakrishnan ......... G06N 20/00
382/154

(Continued)

FOREIGN PATENT DOCUMENTS

CN      108197525 A      6/2018
CN      108229330 A      6/2018

(Continued)

OTHER PUBLICATIONS

China Patent Application No. 202110998216.1; Office Action; dated Mar. 28, 2023; 15 pages.

(Continued)

*Primary Examiner* — Jin Cheng Wang
(74) *Attorney, Agent, or Firm* — BakerHostetler

(57) ABSTRACT
An image generation method, apparatus, and device, and a medium are provided. The method includes: acquiring a first image, keeping a target attribute in the first image unchanged, and editing other attributes in the first image; on the basis of the target attribute and the edited other attributes, generating a second image.

13 Claims, 4 Drawing Sheets

(56)                References Cited

U.S. PATENT DOCUMENTS

| | | | |
|---|---|---|---|
| 2019/0266747 A1 | 8/2019 | Zhou et al. | |
| 2020/0387806 A1* | 12/2020 | Kaseda | G06F 40/35 |
| 2021/0004402 A1* | 1/2021 | Li | G11B 27/11 |
| 2021/0390700 A1* | 12/2021 | Lee | G06F 18/25 |
| 2022/0028139 A1* | 1/2022 | Mitra | G06V 40/175 |
| 2022/0084271 A1* | 3/2022 | Shen | G06T 11/40 |
| 2022/0101577 A1* | 3/2022 | Chakrabarty | G06N 3/09 |
| 2022/0108417 A1* | 4/2022 | Liu | G06T 1/0007 |
| 2022/0148244 A1* | 5/2022 | Ko | G06N 3/045 |
| 2022/0270310 A1* | 8/2022 | Kumar | G06N 3/088 |
| 2022/0327657 A1* | 10/2022 | Zheng | G06T 3/18 |
| 2022/0391611 A1* | 12/2022 | Kalarot | G06N 3/094 |

FOREIGN PATENT DOCUMENTS

| | | |
|---|---|---|
| CN | 108537240 A | 9/2018 |
| CN | 108875537 A | 11/2018 |
| CN | 109615582 A | 4/2019 |
| CN | 110598845 A | 12/2019 |
| CN | 111191526 A | 5/2020 |
| CN | 111325851 A | 6/2020 |
| CN | 111339918 A | 6/2020 |
| CN | 112200818 A | 1/2021 |
| CN | 112560758 A | 3/2021 |
| CN | 112734873 A | 4/2021 |
| CN | 112766366 A | 5/2021 |
| CN | 112991160 A | 6/2021 |
| CN | 113052079 A | 6/2021 |
| CN | 113112416 A | 7/2021 |
| WO | WO 2020/108165 A1 | 6/2020 |

OTHER PUBLICATIONS

China Patent Application No. 202110998216.1; Notification of Grant; dated Jan. 4, 2024; 6 pages.
International Patent Application No. PCT/SG2022/050502; Int'l Search Report and Written Opinion; dated Jan. 30, 2023; 7 pages.
Karras et al.; "A Style-Based Generator Architecture for Generative Adversarial Networks"; IEEE/CVF Conf. on Computer Vision and Pattern Recognition; 2019; p. 4401-4410.
Richardson et al.; "Encoding in Style: a StyleGAN Encoder for Image-to-Image Translation"; IEEE/CVF Conf. on Computer Vision and Pattern Recognition; arXiv:2008.00951; Apr. 2021; 21 pages.
Abdal et al.; "StyleFlow: Attribute-conditioned Exploration of StyleGAN-Generated Images using Conditional Continuous Normalizing Flows"; ACM Transactions on Graphics; vol. 40 No. 3; Apr. 2021; 21 pages.
"MeituXiuXiu lengthening height tutorial"; https://www.qzjlw.com.cn/html/gl/36717.html; QZJLW; Dec. 2020; accessed May 14, 2024; 8 pages (contains English Translation).

* cited by examiner

METHOD, APPARATUS AND DEVICE, AND STORAGE MEDIUM FOR GENERATING IMAGES

CROSS-REFERENCE TO RELATED APPLICATION

The present disclosure is the U.S. National Stage of International Application No. PCT/SG2022/050502, filed on Jul. 15, 2022, which claims priority of the Chinese Patent Application No. 202110998216.1 filed Aug. 27, 2021, and entitled "Image Generation Method, Apparatus, and Device and Storage Medium", the disclosures of which are incorporated herein by reference in their entireties.

TECHNICAL FIELD

The present disclosure belongs to the technical field of image processing, and particularly relates to an image generation method, apparatus, device and storage medium.

BACKGROUND

Related technologies often need images of various categories to train related models, but in reality, the number of images of a certain category is scarce. In order to improve the accuracy of model training, it is necessary to expand the number of these images. Therefore, a reliable image generation method is urgently needed to quickly generate these images.

SUMMARY

In order to solve the above technical problem or at least partially solve the above technical problem, embodiments of the disclosure provide an image generation method, apparatus, device, and storage medium.

A first aspect of embodiments of the present disclosure provides an image generation method. The method includes:

acquiring a first image;
  keeping a target attribute in the first image unchanged and editing other attribute in the first image;
  generating, based on the target attribute and the edited other attribute, a second image.

A second aspect of embodiments of the present disclosure provides an image generation apparatus. The apparatus includes:

a first image acquiring module, configured to acquire a first image;
  an attribute editing module, configured to keep a target attribute in the first image unchanged and edit other attribute in the first image;
  a second image generation module, configured to generate a second image based on the target attribute and the edited other attribute.

A third aspect of the present disclosure provides an image generation device. The image generation device includes a memory and a processor. A computer program is stored on the memory, and upon the computer program being executed by the processor, the image generation method of the first aspect is implemented.

A fourth aspect of the present disclosure provides a computer-readable storage medium. A computer program is stored on the computer-readable storage medium, and upon the computer program being executed by a processor, the image generation method of the first aspect is implemented Compared with the prior art, the technical solution provided by the embodiment of the present disclosure has the following advantages:

The image generation method, apparatus, device and medium provided by the embodiments of the present disclosure can keep the target attribute in the first image unchanged and edit other attribute in the first image after acquiring the first image. Based on the target attribute and the edited other attribute, a second image is generated; and thus, by editing other attribute of the first image, the second image with unchanged target attribute and changed other attribute can be obtained based on the target attribute and the edited other attribute. Therefore, it can achieve quick image generation and improve image diversity, thereby improving the balance of training samples during model training and further improving model performance.

BRIEF DESCRIPTION OF DRAWINGS

The accompanying drawings are used to provide further understanding of the invention and constitute a part of the specification, and serve to explain the invention together with the embodiments of the invention, and do not constitute a limitation of the invention. In the accompanying drawings.

DETAILED DESCRIPTION

Figure 1:
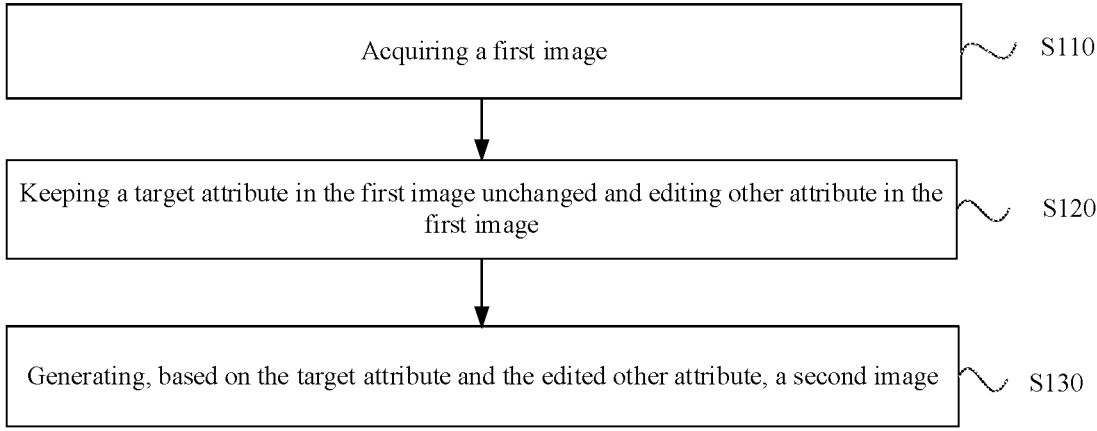
FIG. 1 is a flowchart of an image generation method provided by an embodiment of the present disclosure.

In order to make the above objects, characteristics and advantages of the present disclosure apparent, the technical solutions of the embodiments will be further described below. It should be noted that the embodiments of the present disclosure and the features in the embodiments can be combined with each other in case of no conflict.

In the following description, many specific details are set forth in order to fully understand the present disclosure, but the present disclosure may be implemented in other ways than those described herein; obviously, the embodiments in the specification are only part of the embodiments of the present disclosure, not all of them.

In the training stage of a model, the training effect of the model depends largely on the number of training samples collected and the quality of labeling. For example, when training an end-to-end model to deal with classification tasks, it is necessary to collect an equal number of training samples for each category to train the model. In other words, the balance of training samples can greatly affect the model performance.

Related technologies often need images of various categories to train related models. But in reality, the number of images of a certain category is scarce. In order to improve the accuracy of model training, it is necessary to expand the number of these images.

The classification task as a human face attribute classification task is illustrated as an example. The unibrow belongs to a low distribution category among various categories of eyebrows, resulting in very few sample images of the unibrow actually collected. Therefore, in order to improve the training accuracy of the model, it is necessary to expand the number of sample images of the unibrow, so as to balance the number of sample images of the unibrow and those of other eyebrow shapes, thereby improving the performance of the model.

In order to expand a certain category with a scarce number of training samples, that is, to maintain a balance in the number of training samples for the model, two methods are mainly used in related art to address the issue of imbalanced number of training samples.

Method 1: performing under sampling on a category with a large number of training samples.

Method 2: performing data enhancement on a category with a small number of training samples.

However, the disadvantage of Method 1 is that undersampling the category with a large number of training samples will lead to great waste of data, and the reduction of data will also increase the risk of over-fitting of the model and affect the training effect of the model. Method 2 usually performs data enhancement processing through image rotation and color space conversion, this data enhancement method cannot generate a large number of training samples quickly and has poor diversity of training samples.

In summary, the existing image generation methods are difficult to generate diverse images quickly for a small number of sample images.

In order to solve the above problem, the embodiments of the present disclosure provide an image generation method, apparatus, device and storage medium, which can keep the target attribute in the first image unchanged and edit other attribute in the first image after acquiring the first image. Based on the target attribute and the edited other attribute, a second image is generated; and thus, by editing other attribute of the first image, the second image with unchanged target attribute and changed other attribute can be obtained based on the target attribute and the edited other attribute. Therefore, it can achieve rapid image generation and improve image diversity.

Hereinafter, the image generation method provided by the embodiment of the present disclosure will be firstly described with reference to FIGS. 1-6.

FIG. 1 shows a flowchart of an image generation method provided by an embodiment of the present disclosure.

In some embodiments of the present disclosure, the image generation method shown in FIG. 1 can be performed by an image generation device. The image generation device can include an device with computing and processing functions, such as a tablet computer, a desktop computer and a notebook computer, etc., can also include an device simulated by a virtual machine or a simulator, and can also include an device with storage and computing functions, such as a server or a server cluster, etc.

As shown in FIG. 1, the image generation method can include the following steps.

S110: acquiring a first image.

In the embodiment of the present disclosure, the first image can be exemplarily understood as a small number of images that are not easy to obtain in large quantities.

Optionally, the first image can include, but is not limited to, a human face image, a landscape image, a text image, a grayscale image, etc.

S120: keeping a target attribute in the first image unchanged and editing other attribute in the first image.

Specifically, after acquiring the first image, the image generation device can keep the target attribute unchanged and edit other attribute feature, so that the feature corresponding to the target attribute keeps unchanged and the feature corresponding to the other attribute is changed, so as to generate diversified second images based on the target attribute and the edited other attribute.

In the embodiment of the present disclosure, the target attribute can be a preset attribute in the first image, such as eyebrow, facial shape, posture, etc., but is not limited to the attributes listed here.

In the embodiment of the present disclosure, other attribute can be any attribute other than the target attribute in the first image.

In the embodiment of the present disclosure, S120 can include:

processing to obtain a semantic vector of the first image based on the first image;

editing, based on the semantic vector, a semantic vector of the other attribute in the first image other than the target attribute.

The semantic vector can be a vector corresponding to the first image and carrying feature meaning information, and the feature meaning information can include the attribute represented by the semantic vector.

The feature meaning information can at least include the attribute name of the attribute represented by the semantic vector.

In some embodiments, the processing to obtain the semantic vector of the first image based on the first image can include:

processing to obtain a feature vector of the first image based on the first image;

mapping the feature vector of the first image into a corresponding semantic feature space to obtain the semantic vector of the first image.

Specifically, the image generation device can use a trained feature pyramid model to map the image data of the first image into a corresponding latent space to obtain the feature vector of the first image. And the feature vector of the first image in the latent space is mapped into a corresponding semantic feature space to obtain the semantic vector of the first image.

The latent space can be a space where the feature vector of the first image is located.

The feature pyramid model can be used to decouple and separate the image data of the first image to obtain a latent feature. The latent feature can include the feature vector of the first image, which is helpful to improve the editing efficiency of the semantic vector of the other attribute.

Optionally, the feature pyramid model can be a pyramid scene parsing network or other model, without being limited here.

In some embodiments, the editing, based on the semantic vector, the semantic vector corresponding to the other attribute in the first image can include:

filtering out attribute information from the feature meaning information carried by the semantic vector, and determining an attribute corresponding to the semantic vector;

editing, based on the attribute corresponding to the semantic vector, the semantic vector of the other attribute other than the target attribute.

Specifically, the image generation device can determine the target attribute in advance. According to the feature meaning information carried by each semantic vector corresponding to the first image, the semantic vector corresponding to the other attribute other than the target attribute is determined, and the semantic vector corresponding to the other attribute other than the target attribute is edited by means of style flow.

Style flow can be used to decouple features, control the decoupling of semantic vectors of the other attributes other than the target attribute in the first image, and edit the semantic vectors of the other attributes, thus improving the diversity of semantic vectors of the other attributes, and keeping the semantic vector of the target attribute, so that the efficiency of model training can be improved when the second image generated by using the target attribute and the edited other attributes is used for model training.

The first image as a human face image is illustrated as an example. The target attribute can be unibrow, and other attributes can include age, gender, glasses, posture, skin color, hair quality, etc. The image generation device can use the trained pyramid scene parsing network to map the image data of the first image to the corresponding latent space, so as to obtain the feature vector of the first image. And the feature vector of the first image is mapped into the corresponding semantic feature space to obtain the semantic vector of the first image. By using the style flow method, the semantic vectors corresponding to the attributes such as age, gender, glasses, posture, skin color and hair quality can be filtered out according to the feature meaning information carried by the semantic vector, and then the semantic vectors that are filtered out are edited. Specifically, by increasing or decreasing the age, changing the gender, adding or deleting glasses, changing the skin color and changing the hair quality, etc., the operation of editing other attributes in the first image can be completed.

Therefore, in the embodiment of the present disclosure, the target attribute in the first image can be kept unchanged, and the semantic vectors of other attributes can be edited based on the semantic vectors of the first image, so as to improve the diversity of other attributes while the target attribute in the first image keeps unchanged.

S130: generating, based on the target attribute and the edited other attribute, a second image.

Specifically, after editing the other attribute of the first image, the image generation device can perform inverse transformation on the target attribute and the edited other attribute to generate the second image.

In the embodiment of the present disclosure, S130 can include:

generating, based on a semantic vector corresponding to the target attribute and the edited semantic vector corresponding to the other attribute, the second image.

Specifically, the image generation device can use a generative network model to convert the semantic vector corresponding to the target attribute and the edited semantic vector corresponding to the other attribute into an intermediate latent vector, and perform affine transformation on the intermediate latent vector, so as to realize the inverse transformation on the target attribute and the edited other attribute to generate the second image.

The generative network model can be used to further decouple, separate and synthesize the target attribute and the other edited attribute, so as to generate the second image. The diversity of features of the other attributes can be improved while retaining the feature of the target attribute, so that the efficiency and reliability of model training can be improved when model training is performed based on the generated second image.

Optionally, the generative network model can be a style generative adversarial network or other networks, without being limited here.

The first image as a human face image is still illustrated as an example. The target attribute can be unibrow, and other attributes can include age, gender, glasses, posture, skin color, hair quality, etc. After acquiring the edited other attribute, the image generation device can use the style generative adversarial network to convert the semantic vector corresponding to the target attribute and the edited semantic vector corresponding to the other attribute into an intermediate latent vector, and perform affine transformation on the intermediate latent vector, so as to realize the inverse transformation on the target attribute and the edited other attribute to generate the second image.

Figure 2:
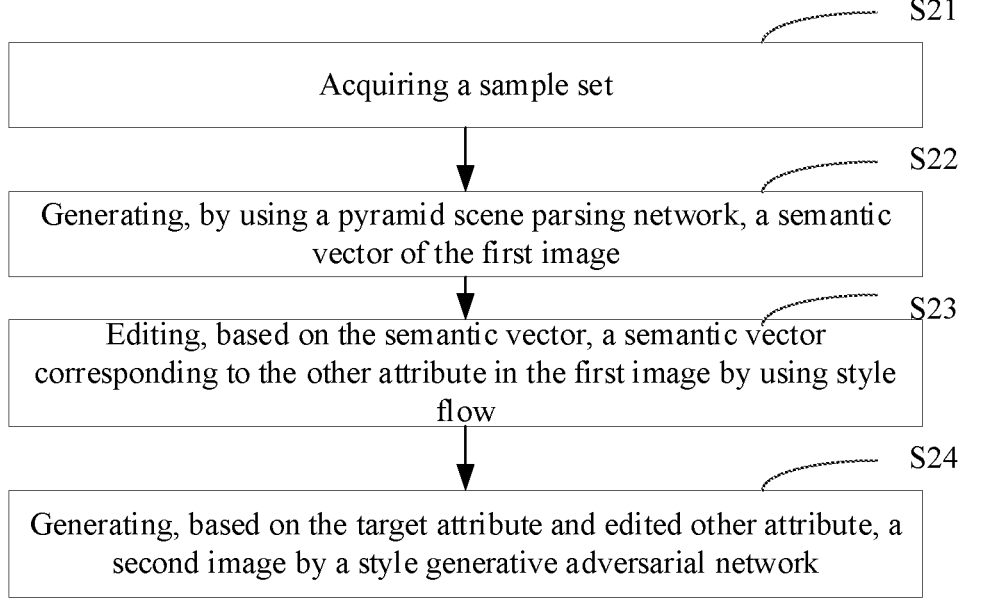
FIG. 2 is a schematic logical diagram of an image generation method provided by an embodiment of the present disclosure.

FIG. 2 shows a schematic logical diagram of an image generation method provided by an embodiment of the present disclosure. The above steps S110-S130 are explained with reference to FIG. 2.

As shown in FIG. 2, the image generation method can include the following steps.

S21: acquiring a sample set.

The sample set can be first images.

S22: generating, by using a pyramid scene parsing network, a semantic vector of the first image.

S22 can include: by using the pyramid scene parsing network, mapping the image data of the first image into a corresponding latent space to obtain a feature vector of the first image, and mapping the feature vector of the first image in the latent space into a corresponding semantic feature space to obtain the semantic vector of the first image.

S23: editing, based on the semantic vector, a semantic vector corresponding to the other attribute in the first image by using style flow.

S23 can include: filtering out feature meaning information corresponding to the other attribute from the feature meaning information carried by the semantic vector; and editing, based on the feature meaning information corresponding to the other attribute, the semantic vector of the other attribute by using style flow.

S24: generating, based on the target attribute and the edited other attribute, a second image by a style generative adversarial network.

S24 can include: by using the style generative adversarial network, converting the semantic vector corresponding to the target attribute and the edited semantic vector corresponding to the other attribute into an intermediate latent vector, and performing affine transformation on the intermediate latent vector, so as to realize the inverse transformation on the target attribute and the edited other attribute to generate the second image.

In the embodiment of the present disclosure, after acquiring the first image, the target attribute in the first image can be kept unchanged, and the other attribute in the first image can be edited. Based on the target attribute and the edited other attribute, a second image is generated; and thus, by editing other attribute of the first image, the second image with unchanged target attribute and changed other attribute can be obtained based on the target attribute and the edited other attribute. Therefore, it can achieve rapid image generation and improve image diversity, thereby improving the balance of training samples during model training and further improving model performance.

In another implementation of the present disclosure, a plurality of images with the same target attributes can be acquired as the first images, and weighted average processing can be performed according to the feature vectors of the plurality of images. Because the target attributes of the plurality of images are the same, the target attributes will not change after the weighted average processing is performed on the feature vectors of the plurality of images, while other attributes will change due to the weighted average process. Therefore, based on the result of the weighted average process, the generated second image is an image with the target attribute unchanged and the other attributes changed. Therefore, it can achieve rapid image generation and improve image diversity.

Figure 3:
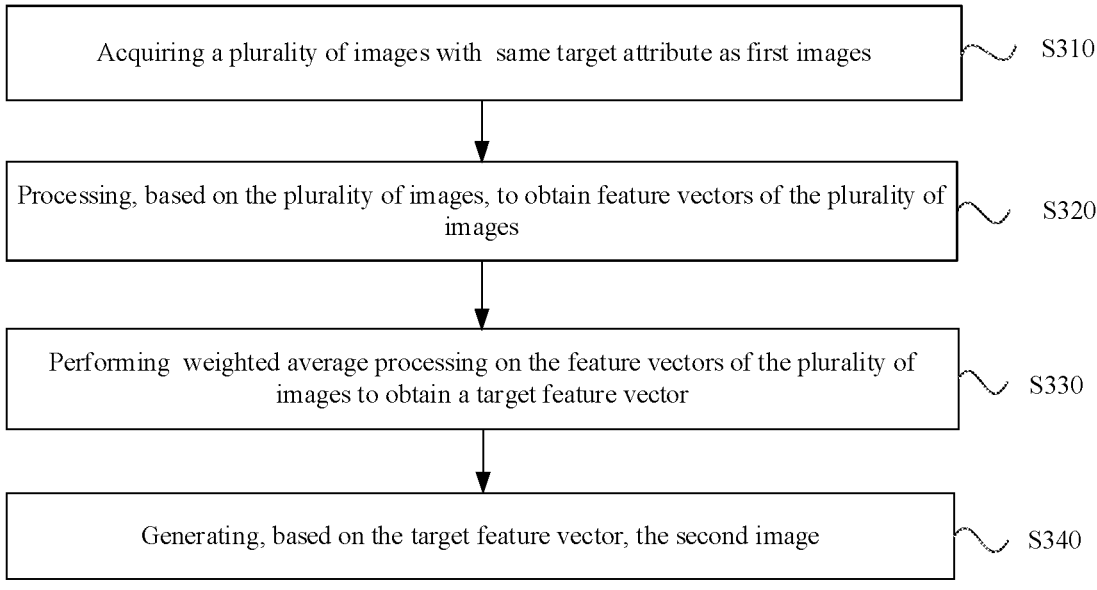
FIG. 3 is a flowchart of another image generation method provided by an embodiment of the present disclosure.

FIG. 3 shows a flowchart of another image generation method provided by an embodiment of the present disclosure.

As shown in FIG. 3, the image generation method can include the following steps.

S310: acquiring a plurality of images with the same target attribute as first images.

Specifically, the image generation device can acquire a plurality of images with the same target attribute, which are used for generating diverse images, as the first images, so as to generate a second image according to the image features of the plurality of images with the same target attribute.

In the embodiment of the present disclosure, the plurality of images with the same target attribute can be images of a target attribute which are scarce.

The first image as a human face image is illustrated as an example. The target attribute can be unibrow, and other attributes can include age, gender, glasses, posture, skin color, hair quality, etc. The unibrow belongs to a low distribution category among various categories of eyebrows, and thus, the plurality of images with the same target attribute can be a plurality of unibrow images. The image generation device can acquire a plurality of unibrow images as the first images, so as to generate a second image according to the image features of the plurality of unibrow images.

S320: processing, based on the plurality of images, to obtain feature vectors of the plurality of images.

In the embodiment of the present disclosure, the feature vectors can be vectorized representation of image features of the plurality of images.

Specifically, after acquiring the plurality of images, the image generation device can use a trained feature pyramid model to map the image data of the plurality of images into a corresponding latent space, so as to obtain the feature vectors of the plurality of images.

The first images as a plurality of human face images is illustrated as an example, The target attribute can be unibrow, and other attributes can include age, gender, glasses, posture, skin color, hair quality, etc. After acquiring the plurality of unibrow images, the image generation device can use the trained feature pyramid model to map the image data of the plurality of images into the corresponding latent space, so as to obtain the feature vectors of the plurality of images. That is, the feature vector corresponding to unibrow and the feature vectors corresponding to age, gender, glasses, posture, skin color and hair quality respectively, are obtained. The feature vector corresponding to unibrow and the feature vectors corresponding to age, gender, glasses, posture, skin color and hair quality respectively are used as the feature vectors of the plurality of images.

S330: performing weighted average processing on the feature vectors of the plurality of images to obtain a target feature vector.

Specifically, after acquiring the feature vectors of the plurality of images, the image generation device can perform weighted average processing on the feature vectors of the plurality of images according to the preset weight corresponding to each of the feature vector, so as to obtain the target feature vector.

It should be understood that the target attributes of the plurality of images are the same, and the other attributes of the plurality of images are different. Therefore, after performing the weighted average processing on the feature vectors of the plurality of images according to the preset weight corresponding to each of the feature vectors, the target feature vector corresponding to the target attribute keeps unchanged, and the target feature vectors corresponding to the other attributes will change, so as to realize the effect of editing other attributes in the first image without changing the target attribute.

The first images as a plurality of human face images is illustrated as an example. The target attribute can be unibrow, and other attributes can include age, gender, glasses, posture, skin color, hair quality, etc. The target attributes of each of the human face images is the same, and other attributes of the human face images are different. According to the preset weight corresponding to each feature vector, the image generation device performs weighted average processing on the attributes of the plurality of images, such as eyebrows, age, gender, glasses, posture, skin color, hair quality, etc., respectively, so that the target feature vector corresponding to unibrow keeps unchanged, and the target feature vectors corresponding to age, gender, glasses, posture, skin color, hair quality, etc., will change, thus realizing the effect of editing other attributes in the first image without changing the unibrow.

S340: generating, based on the target feature vector, the second image.

Specifically, after generating the target feature vectors, the image generation device can perform inverse transformation on the target feature vectors to generate the second image.

In the embodiment of the present disclosure, the image generation device can use a generative network model to convert the target feature vector into an intermediate latent vector, and perform affine transformation on the intermediate latent vector, so as to realize the inverse transformation on the target feature vector to generate the second image.

Figure 4:
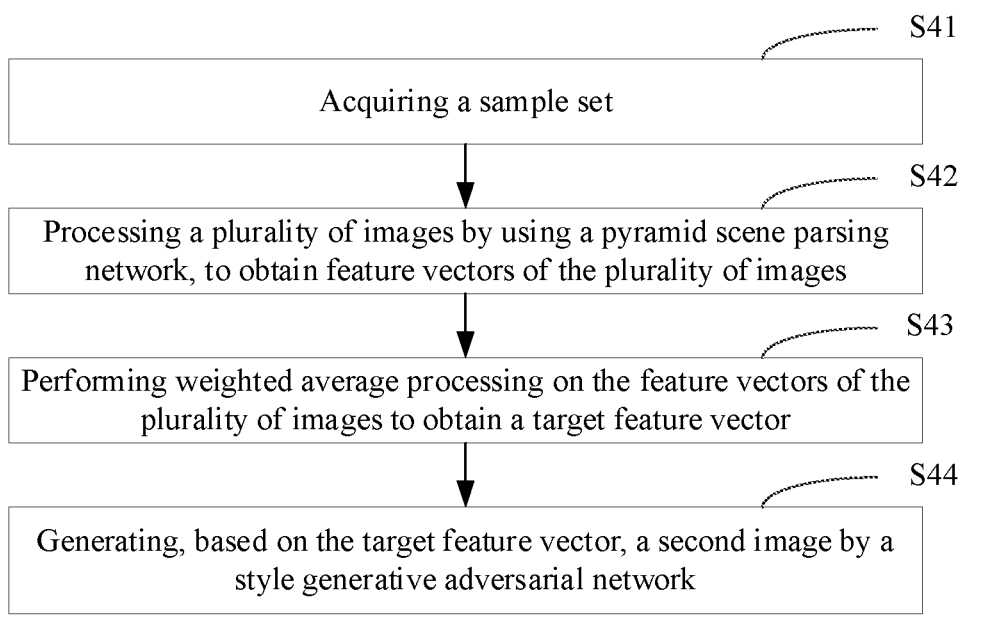
FIG. 4 is a schematic logical diagram of another image generation method provided by an embodiment of the present disclosure.

FIG. 4 shows a schematic logical diagram of another image generation method provided by an embodiment of the present disclosure. The above steps S110-S130 are explained with reference to FIG. 4.

As shown in FIG. 4, the image generation method can include the following steps.

S41: acquiring a sample set.

The sample set can be a plurality of images with the same target attribute, that is, the sample set are the first images.

S42: processing the plurality of images by using a pyramid scene parsing network, to obtain feature vectors of the plurality of images.

S42 can include: mapping image data of the plurality of images into a corresponding latent space by using the pyramid scene parsing network, so as to obtain the feature vectors of the plurality of images.

S43: performing weighted average processing on the feature vectors of the plurality of images to obtain a target feature vector.

S43 can include: performing the weighted average processing on the feature vectors of the plurality of images according to the preset weight corresponding to each of the feature vectors, so as to obtain the target feature vector.

S44: generating, based on the target feature vector, a second image by a style generative adversarial network.

S44 can include: by using the style generative adversarial network, converting the target feature vector into an intermediate latent vector, and performing affine transformation on the intermediate latent vector, so as to realize the inverse transformation on the target attribute and the edited other attribute to generate the second image.

Therefore, in the embodiment of the present disclosure, a plurality of images with the same target attributes can be obtained as the first images, and weighted average processing can be performed according to the feature vectors of the plurality of images; thus, the other attributes can be edited to be changed while the target attribute keeps unchanged, the target feature vectors can be obtained, and a second image can be generated based on the target feature vectors. Therefore, it can achieve rapid image generation and improve image diversity.

In further another implementation of the present disclosure, in order to further improve the accuracy of the second image, a plurality of semantic vectors with the same target attribute can be firstly edited, and the edited semantic vectors are subjected to weighted average process, so as to generate a second image according to the target semantic vector obtained after the weighted average process, thus further improving the reliability of the second image.

Figure 5:
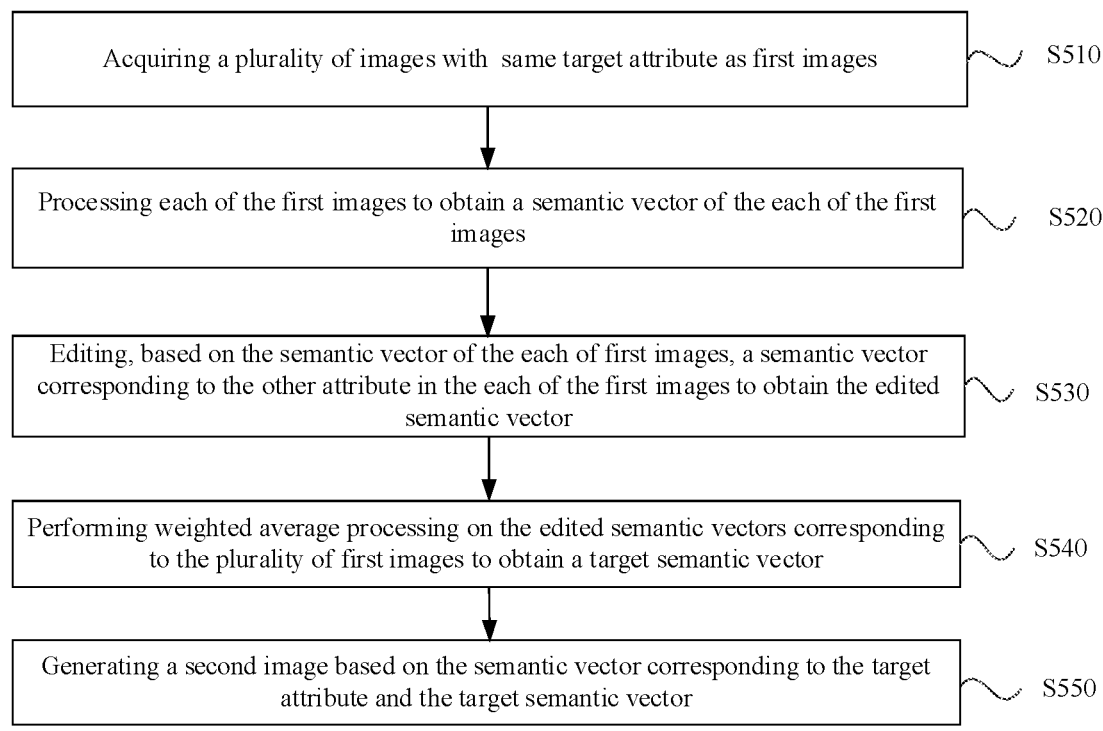
FIG. 5 is a flowchart of further another image generation method provided by an embodiment of the present disclosure.

FIG. 5 shows a flowchart of further another image generation method provided by an embodiment of the present disclosure.

As shown in FIG. 5, the image generation method can include the following steps.

S510: acquiring a plurality of images with the same target attribute as first images.

S510 is similar to S310, and details will not be repeated here.

S520: processing each of the first images to obtain a semantic vector of the each of the first images.

In the embodiment of the present disclosure, S520 can include:

processing each of the first images to obtain a feature vector of the each of the first images;

mapping the feature vector of the each of the first images into a corresponding semantic feature space to obtain the semantic vector of the each of the first images.

Specifically, after acquiring the plurality of images, the image generation device can use a trained feature pyramid model to map the image data of each of the first images into a corresponding latent space, so as to obtain the feature vector of each of the first images. And the feature vector of each of the first images in the latent space is mapped into the corresponding semantic feature space to obtain the semantic vector of each of the first images.

S530: editing, based on the semantic vector of the each of the first images, a semantic vector corresponding to the other attribute in the each of the first images to obtain the edited semantic vector.

In the embodiment of the present disclosure, S530 can include:

filtering out feature meaning information corresponding to the other attribute from the feature meaning information carried by the semantic vector of each of the first images;

editing, based on the feature meaning information corresponding to the other attribute, the semantic vector corresponding to the other attribute in the each of the first images to obtain the edited semantic vector.

Specifically, the image generation device can determine the target attribute in advance, and filter out the attribute names corresponding to other attributes according to the attribute name of each attribute in the feature meaning information carried by the semantic vector. Based on the attribute names corresponding to the other attributes, the semantic vectors of the other attributes are edited by means of style flow.

S540: performing weighted average processing on the edited semantic vectors corresponding to the plurality of first images to obtain a target semantic vector.

Specifically, after acquiring the edited semantic vectors corresponding to the plurality of first images, the image generation device can perform weighted average processing on the edited semantic vectors corresponding to the plurality of first images according to the preset weight corresponding to each feature vector, so as to obtain the target feature vector.

It can be understood that because the target attributes of the plurality of first images are the same, after editing the semantic vectors corresponding to other attributes in each of the first images based on the semantic vectors of each of the first images, the semantic feature of the target attribute keeps unchanged, and the semantic features of the other attributes will change. Furthermore, the semantic feature of the target attribute still keeps unchanged and the semantic features of the other attributes will also change after the weighted average processing on the edited semantic vectors corresponding to the plurality of first images.

S550: generating a second image based on the semantic vector corresponding to the target attribute and the target semantic vector.

Specifically, the image generation device can use a generative network model to convert the semantic vector corresponding to the target attribute and the target semantic vector into an intermediate latent vector, and perform affine transformation on the intermediate latent vector, so as to realize the inverse transformation on the target attribute and the edited other attribute to generate the second image.

Therefore, in the embodiment of the present disclosure, by editing a plurality of images with the same target attribute, and then performing weighted average processing on the edited plurality of images, the target attribute can keep unchanged, and the diversity of other attribute changes can be improved. The second image is generated based on the semantic vector corresponding to the target attribute and the target semantic vector, which further improves the reliability of the second image.

In still another embodiment of the present disclosure, in order to further improve the accuracy of the second image, the feature vectors of a plurality of images with the same target attribute can be subjected to weighted average processing firstly to obtain the target feature vector. And the semantic vectors corresponding to the target feature vector are edited to generate a second image according to the semantic vector corresponding to the target attribute and the edited semantic vectors corresponding to other attributes, thus further improving the reliability of the second image.

Figure 6:
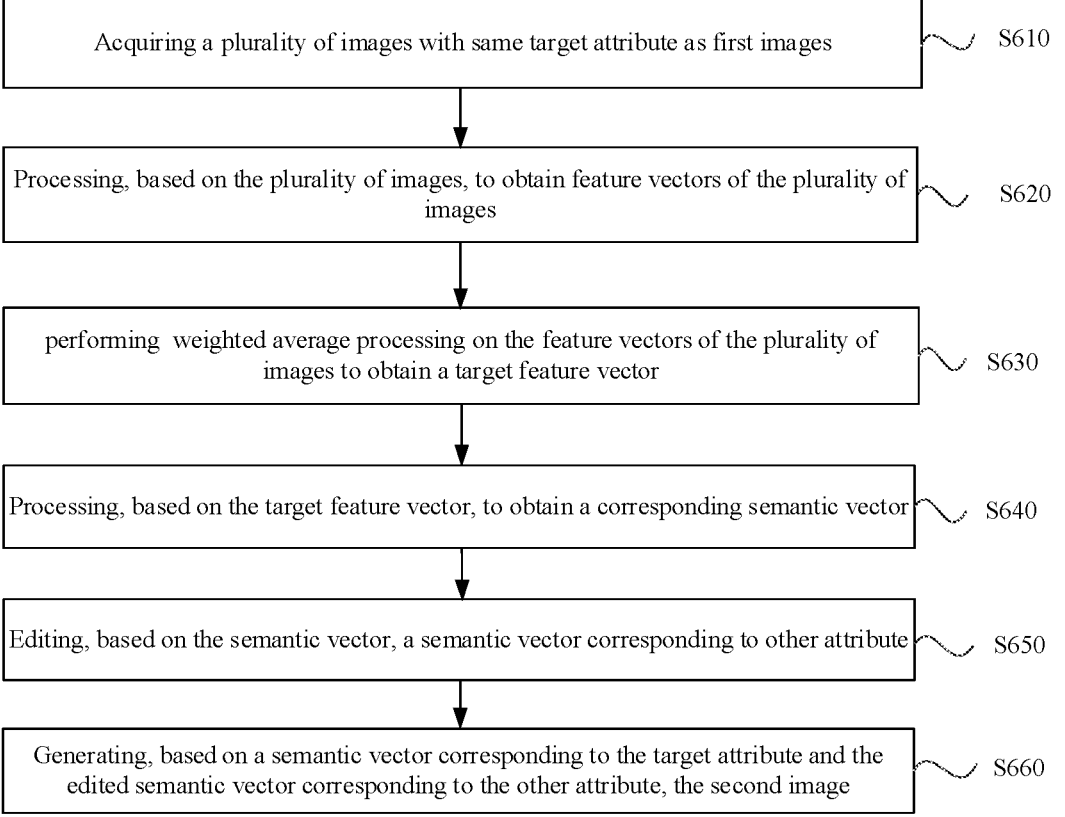
FIG. 6 is a flowchart of still another image generation method provided by an embodiment of the present disclosure.

FIG. 6 shows a flowchart of still another image generation method provided by an embodiment of the present disclosure.

As shown in FIG. 6, the image generation method can include the following steps.

S610: acquiring a plurality of images with the same target attribute as first images.

S620: processing, based on the plurality of images, to obtain feature vectors of the plurality of images.

S630: performing weighted average processing on the feature vectors of the plurality of images to obtain a target feature vector.

S610-S630 are similar to S310-S330, and details will not be repeated here.

S640: processing, based on the target feature vector, to obtain a corresponding semantic vector.

In the embodiment of the present disclosure, S640 can include:

mapping the target feature vector into a corresponding semantic feature space to obtain the semantic vector corresponding to the target feature vector.

Specifically, after acquiring the target feature vector, the image generation device can map the target feature vector in the latent space into the corresponding semantic feature space to obtain the semantic vector corresponding to the target feature vector.

Optionally, a trained feature pyramid model can be used to map the target feature vector in the latent space to the corresponding semantic feature space to obtain the semantic vector corresponding to the target feature vector.

S650: editing, based on the semantic vector, a semantic vector corresponding to the other attribute.

In the embodiment of the present disclosure, S650 can include:

filtering out feature meaning information corresponding to the other attribute from the feature meaning information carried by the semantic vector;

editing, based on the feature meaning information corresponding to the other attribute, the semantic vector corresponding to the other attribute to obtain the edited semantic vector.

Specifically, the image generation device can determine the target attribute in advance, and filter out the attribute names corresponding to other attributes according to the attribute name of each attribute in the feature meaning information carried by the semantic vector. And based on the attribute names corresponding to the other attributes, the semantic vectors of the other attributes are edited by means of style flow.

S660: generating, based on a semantic vector corresponding to the target attribute and the edited semantic vector corresponding to the other attribute, the second image.

Specifically, the image generation device can use a generative network model to convert the semantic vector corresponding to the target attribute and the edited semantic vector corresponding to the other attribute into an intermediate latent vector, and perform affine transformation on the intermediate latent vector, so as to realize the inverse transformation on the target attribute and the edited other attribute to generate the second image.

Therefore, in the embodiment of the present disclosure, the feature vectors of the plurality of images with the same target attribute are subjected to the weighted average processing first to obtain the target feature vector, and the semantic vectors corresponding to the target feature vector are edited to generate a second image according to the semantic vector corresponding to the target attribute and the edited semantic vector corresponding to the other attribute, which further improves the reliability of the second image.

Figure 7:
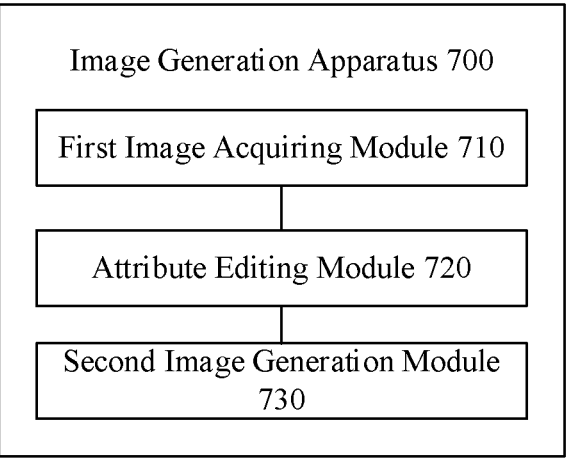
FIG. 7 is a schematic structural diagram of an image generation apparatus provided by an embodiment of the present disclosure.

FIG. 7 shows a schematic structural diagram of an image generation apparatus provided by an embodiment of the present disclosure.

In some embodiments of the present disclosure, the image generation apparatus shown in FIG. 7 can be applied to an image generation device. The image generation device can be an electronic device or a server. The electronic device can include an device with communication function, such as a mobile phone, a tablet computer, a desktop computer, a notebook computer, a vehicle-mounted terminal, a wearable device, an all-in-one PC, a smart home device, etc., and can also include an device simulated by a virtual machine or a simulator. The server can be an device with storage and computing functions, such as a cloud server or a server cluster, etc.

As shown in FIG. 7, the image generation apparatus 700 can include a first image acquiring module 710, an attribute editing module 720 and a second image generation module 730.

The first image acquiring module 710 can be configured to obtain a first image.

The attribute editing module 720 can be configured to keep a target attribute in the first image unchanged and edit other attribute in the first image.

The second image generation module 730 can be configured to generate a second image based on the target attribute and the edited other attribute.

In the embodiment of the present disclosure, after acquiring the first image, the target attribute in the first image keeps unchanged, and the other attribute in the first image can be edited. Based on the target attribute and the edited other attribute, a second image is generated; and thus, by editing other attribute of the first image, the second image with unchanged target attribute and changed other attribute can be obtained based on the target attribute and the edited other attribute. Therefore, it can achieve rapid image generation and improve image diversity, thereby improving the balance of training samples during model training, which further improves model performance.

Optionally, the attribute editing module 720 can be further configured to process to obtain semantic vectors of the first image based on the first image, and edit a semantic vector corresponding to the other attribute in the first image based on the semantic vectors.

Optionally, the first image acquiring module 710 can be further configured to acquire a plurality of images with the same target attribute as first images.

Optionally, the attribute editing module 720 can be further configured to process each of the first images to obtain a semantic vector of the first image;

edit, based on the semantic vector of the each of the first images, a semantic vector corresponding to the other attribute in the each of the first images to obtain the edited semantic vector; and perform weighted average processing on the edited semantic vectors corresponding to the plurality of first images to obtain a target semantic vector.

Optionally, the second image generation module 730 can be further configured to generate a second image based on the semantic vector corresponding to the target attribute and the target semantic vector.

Optionally, the attribute editing module 720 can be further configured to process to obtain feature vectors of the plurality of images based on the plurality of images; and perform weighted average processing on the feature vectors of the plurality of images to obtain a target feature vector.

Optionally, the second image generation module 730 can be further configured to generate the second image based on the target feature vector.

Optionally, the attribute editing module 720 can be further configured to process to obtain a corresponding semantic vector based on the target feature vector; and edit a semantic vector corresponding to the other attribute based on the semantic vector.

Optionally, the second image generation module 730 can be further configured to generate the second image based on a semantic vector corresponding to the target attribute and the edited semantic vector corresponding to the other attribute.

It should be noted that the image generation apparatus 700 shown in FIG. 7 can execute various steps in the method embodiments shown in FIGS. 1 and 6, and realize various processes and effects in the method embodiments shown in FIGS. 1 and 6, and details will not be repeated here.

An embodiment of the present disclosure further provides an image generation device. The image generation device includes a processor and a memory, a computer program is stored on the memory, and upon the computer program being executed by the processor, the method in any one of the above-mentioned embodiments shown in FIGS. 1-7 can be realized.

Figure 8:
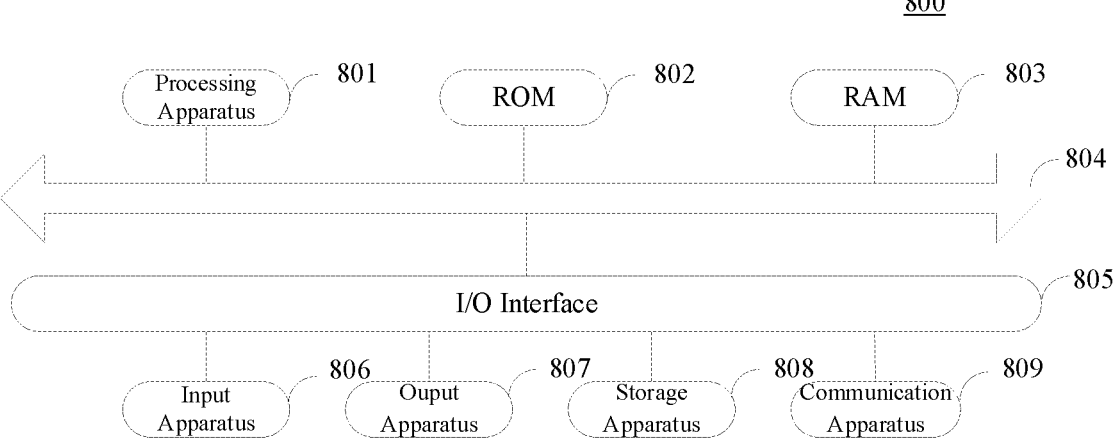
FIG. 8 is a schematic structural diagram of an image generation device provided by an embodiment of the present disclosure.

For example, FIG. 8 is a schematic structural diagram of an image generation device in the embodiment of the present disclosure. Referring specifically to FIG. 8, there is shown a schematic diagram of a structure suitable for implementing the image generation device 800 in the embodiment of the present disclosure. The image generation device 800 in the embodiment of the present disclosure can include, but is not limited to, a mobile terminal such as a mobile phone, a notebook computer, a digital broadcast receiver, a personal digital assistant (PDA), a tablet computer (PAD), a portable multimedia player (PMP), a vehicle-mounted terminal (e.g., a vehicle-mounted navigation terminal), etc., or a fixed terminal such as a digital TV, a desktop computer, etc., and can also be a server. The server can be an device with storage and computing functions, such as a cloud server or a server cluster, etc. The image generation device shown in FIG. 8 is just an example, and should not bring any limitation to the function and use scope of the embodiment of the present disclosure.

As shown in FIG. 8, the image generation device 800 can include a processing apparatus (e.g., a central processing unit, a graphics processing unit, etc.) 801, which can perform various appropriate actions and processes according to a program stored in a read-only memory (ROM) 802 or a program loaded from a storage apparatus 808 into a random access memory (RAM) 803. In the RAM 803, various programs and data required for the operations of the image generation device 800 are also stored. The processing apparatus 801, the ROM 802 and the RAM 803 are connected to each other through a bus 804. An input/output (I/O) interface 805 is also connected to the bus 804.

Generally, the following apparatuses can be connected to the I/O interface 805: an input apparatus 806 including, for example, a touch screen, a touch pad, a keyboard, a mouse, a camera, a microphone, an accelerometer, a gyroscope, etc.; an output apparatus 807 including, for example, a liquid crystal display (LCD), a speaker, a vibrator, etc.; a storage apparatus 808, including, for example, a magnetic tape, a hard disk, etc.; and a communication apparatus 809. The communication apparatus 809 can allow the image generation device 800 to communicate wirelessly or wired with other devices to exchange data. Although FIG. 8 shows an image generation device 800 with various apparatuses, it should be understood that it is not required to implement or have all the apparatuses shown. More or fewer apparatuses can alternatively be implemented or provided.

In particular, according to the embodiments of the present disclosure, the process described above with reference to the flowchart can be implemented as a computer software program. For example, an embodiment of the present disclosure includes a computer program product including a computer program carried on a non-transitory computer-readable medium, and the computer program contains program codes used for executing the method shown in the flowchart. In such an embodiment, the computer program can be downloaded and installed from the network through the communication apparatus 809, or installed from the storage apparatus 808, or installed from the ROM 802. When the computer program is executed by the processing apparatus 801, the above functions defined in the method of the embodiment of the present disclosure are performed.

It should be noted that the computer-readable medium mentioned above in this disclosure can be a computer-readable signal medium or a computer-readable storage medium, or any combination thereof. The computer-readable storage medium can be, for example, but not limited to, an electronic, magnetic, optical, electromagnetic, infrared or semiconductor system, apparatus or element, or any suitable combination of the foregoing. More specific examples of the computer-readable storage medium can include, but are not limited to, an electrical connection based on one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, the computer-readable storage medium can be any tangible medium that contains or stores a program for use by or in combination with an instruction execution system, apparatus or device. While in the present disclosure, the computer-readable signal medium can include data signals propagated in a baseband or as part of a carrier wave, in which computer-readable program codes are carried. Such propagated signals can take a variety of forms, including, but not limited to, an electro-magnetic signal, an optical signal, or any suitable combination thereof. The computer-readable signal medium can also be any computer-readable medium other than a computer-readable storage medium, and the computer-readable signal medium can send, propagate or transmit a program for use by or in combination with an instruction execution system, apparatus or device. Program codes contained on the computer-readable medium can be transmitted using any appropriate medium, including, but not limited to, a wireline, an optical fiber cable, RF (radio frequency), etc., or any suitable combination of the foregoing.

In some embodiments, clients and servers can communicate using any network protocol currently known or to be developed in the future, such as HyperText Transfer Protocol (HTTP), and can be interconnected with any form or medium of digital data communication (such as a communication network). Examples of the communication network include a local area network (LAN), a wide area network (WAN), an internet (such as the Internet), and a peer-to-peer network (such as an Ad-Hoc network), as well as any network currently known or to be developed in the future.

The computer-readable medium can be included in the image generation device or can exist alone without being assembled into the image generation device.

The computer-readable medium carries one or more programs that, where the one or more programs, when executed by the image generation device, cause the image generation device to: acquire a first image; keep a target attribute in the first image unchanged and edit other attribute in the first image; and generate, based on the target attribute and the edited other attribute, a second image.

Computer program codes for performing the operations in the present disclosure can be written in one or more programming languages or combination thereof. The one or more programming languages include, but are not limited to, object-oriented programming languages such as Java, Smalltalk and C++, as well as conventional procedural programming languages such as "C" or similar programming languages. Program codes can be executed entirely on a user computer, executed partly on a user computer, executed as a stand-alone software package, executed partly on a user computer and partly on a remote computer, or executed entirely on a remote computer or an image generation device. In the case related to the remote computer, the remote computer can be connected to the user computer via any kind of network including a local area network (LAN) or a wide area network (WAN), or can be connected to an external computer (for example, via the Internet through an Internet service provider).

Flowcharts and block diagrams among the accompanying drawings illustrate architectures, functions, and operations possible to implement in accordance with the system, method, and computer program product in various embodiments of the present disclosure. In this regard, each block in the flowcharts or block diagrams can represent a module, a program segment, or part of codes that contains one or more executable instructions for implementing specified logical functions. It is to be noted that in some alternative implementations, functions marked in blocks can occur in an order different from that marked in the accompanying drawings. For example, two successive blocks can, in fact, be executed substantially in parallel or in reverse order, which depends on the functions involved. It is also to be noted that each block in the block diagrams and/or flowcharts and a combination of blocks in the block diagrams and/or flowcharts can be implemented by a special-purpose hardware-based system which executes specified functions or operations, or a combination of special-purpose hardware and computer instructions.

The involved units described in the embodiments of the present disclosure can be implemented by software or hardware. The name of a unit is not intended to limit the unit in a certain circumstance.

The functions described above herein can be executed, at least partially, by one or more hardware logic components. For example, without limitations, example types of hardware logic components that can be used include: a field-programmable gate array (FPGA), an application-specific integrated circuit (ASIC), an application-specific standard product (ASSP), a system on a chip (SOC), a complex programmable logic device (CPLD) and the like.

In the context of the present disclosure, a machine-readable medium can be a tangible medium that can include or store a program used by an instruction execution system, apparatus, or device or used in conjunction with an instruction execution system, apparatus, or device. The machine-readable medium can be a machine-readable signal medium or a machine-readable storage medium. The machine-readable medium can include, but is not limited to, an electronic, magnetic, optical, electromagnetic, infrared, or semiconductor system, apparatus, or device or any suitable combination thereof. More specific examples of the machine-readable storage medium can include an electrical connection based on one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination thereof.

An embodiment of the present disclosure further provides a computer-readable storage medium, a computer program is stored on the computer-readable storage medium, and upon the computer program being executed by a processor, the method of any one of the above-mentioned embodiments shown in FIGS. 1-7 can be realized, and the execution manner and beneficial effects are similar, which are not repeated here.

It should be noted that relational terms such as "first" and "second" are used herein only to distinguish one entity or operation from another, and do not necessarily require or imply any such actual relationship or order between these entities or operations. Furthermore, the term "include", "comprise" or any other variation thereof is intended to cover non-exclusive inclusion, so that a process, method, article or equipment comprising a set of elements includes not only those elements but also other elements not expressly listed, or elements inherent to such process, method, article or equipment. Without more limitation, an element defined by the sentence "include a . . . " does not preclude the existence of additional identical elements in a process, method, article or device comprising the element.

The foregoing are only embodiments of this disclosure which enables those skilled in the art to understand or implement this disclosure. Various modifications to these embodiments will be apparent to those skilled in the art, and the general principles defined herein can be implemented in other embodiments without departing from the spirit or scope of this disclosure. Therefore, the disclosure will not be limited to these embodiments described herein, but will conform to the broadest scope consistent with the principles and novel features disclosed herein.

The invention claimed is:

1. An image generation method, comprising:

acquiring a plurality of first images with a same attribute;

keeping the same attribute in each of the plurality of first images unchanged while editing at least one other attribute in each of the plurality of first images, wherein the editing the at least one other attribute while keeping the same attribute in each of the plurality of images unchanged comprises:

editing semantic vectors corresponding to the at least one other attribute in each of the plurality of first images to obtain edited semantic vectors, and carrying out weighted average processing on the edited semantic vectors to obtain a semantic vector; and generating, based on the same attribute and the semantic vector, a second image.

2. The method according to claim 1 further comprising:
processing each of the plurality of first images to obtain the semantic vectors corresponding to the at least one other attribute in each of the plurality of first images.

3. The method according to claim 1, wherein the generating, based on the same attribute and the semantic vector, the second image comprises:
generating, based on a semantic vector corresponding to the same attribute and the semantic vector, the second image.

4. The method according to claim 1, wherein the determining the same attribute in the first image that is to remain unchanged and editing the at least one other attribute in the first image comprises:
processing, based on the plurality of first images, to obtain feature vectors of the plurality of first images; and
performing weighted average processing on the feature vectors of the plurality of first images to obtain a feature vector.

5. The method according to claim 4, wherein the generating, based on the same attribute and the semantic vector, the second image comprises:
generating, based on the feature vector, the second image.

6. The method according to claim 4, wherein after the performing the weighted average processing on the feature vectors of the plurality of first images to obtain the feature vector, the method further comprises:
processing, based on the feature vector, to obtain a corresponding semantic vector;
editing, based on the semantic vector, a semantic vector corresponding to the other attribute.

7. A computer-readable storage medium, wherein a computer program is stored on the computer-readable storage medium, and upon the computer program being executed by a processor, the image generation method according to claim 1 is implemented.

8. An image generation apparatus, comprising:
a first image acquiring module, configured to acquire a plurality of first images with a same attribute;
an attribute editing module, configured to keep the same attribute in each of the plurality of first images unchanged while editing at least one other attribute in each of the plurality of first images, wherein the editing the at least one other attribute while keeping the same attribute in each of the plurality of images unchanged comprises:
editing semantic vectors corresponding to the at least one other attribute in each of the plurality of first images to obtain edited semantic vectors, and carrying out weighted average processing on the edited semantic vectors to obtain a semantic vector; and
a second image generation module, configured to generate, based on the same attribute and the semantic vector, a second image.

9. The image generation apparatus according to claim 8, wherein the attribute editing module is further configured to:
process each of the plurality of first images to obtain the semantic vectors corresponding to the at least one other attribute in each of the plurality of first images.

10. The image generation apparatus according to claim 8, wherein the second image generation module is further configured to:
generate, based on a semantic vector corresponding to the same attribute and the target semantic vector, the second image.

11. The image generation apparatus according to claim 8, wherein the attribute editing module is further configured to:
process, based on the plurality of first images, to obtain feature vectors of the plurality of first images; and
perform weighted average processing on the feature vectors of the plurality of first images to obtain a feature vector.

12. The image generation apparatus according to claim 11, wherein the second image generation module is further configured to:
generate, based on the feature vector, the second image.

13. An image generation device, comprising:
a memory and a processor, wherein a computer program is stored on the memory, and the computer program upon being executed by the processor causes the processor to implement operations the operations comprise:
acquiring a plurality of first images with a same attribute;
keeping the same attribute in each of the plurality of first images unchanged while editing at least one other attribute in each of the plurality of first images, wherein the editing the at least one other attribute while keeping the same attribute in each of the plurality of images unchanged comprises:
editing semantic vectors corresponding to the at least one other attribute in each of the plurality of first images to obtain edited semantic vectors, and
carrying out weighted average processing on the edited semantic vectors to obtain a semantic vector; and
generating, based on the same attribute and the semantic vector, a second image.

* * * * *